(12) United States Patent
Kesani

(10) Patent No.: US 11,208,022 B2
(45) Date of Patent: Dec. 28, 2021

(54) SAFETY ASSEMBLY FOR OFF-HIGHWAY TRUCK

(71) Applicant: Caterpillar Inc., Peoria, IL (US)

(72) Inventor: Sharath Kesani, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 251 days.

(21) Appl. No.: 16/656,381

(22) Filed: Oct. 17, 2019

(65) Prior Publication Data

US 2021/0114503 A1    Apr. 22, 2021

(51) Int. Cl.
*B60P 1/28* (2006.01)
*B60S 5/00* (2006.01)

(52) U.S. Cl.
CPC ............... *B60P 1/283* (2013.01); *B60S 5/00* (2013.01); *B60Y 2200/20* (2013.01)

(58) Field of Classification Search
CPC .... B60P 1/26; B60P 1/283; B60P 1/56; B60P 1/286; B60P 1/16; B60P 1/165; B60P 1/28; B60P 1/36; B60P 1/162; B60P 1/34; B60P 1/42
USPC ..... 298/7, 22 R, 18, 23 MD, 24, 17 R, 23 R, 298/8 R, 17 SG, 17.5, 17.6; 296/183.2, 296/39.2, 181.6, 182.1, 38, 51, 56, 57.1
See application file for complete search history.

(56) References Cited

U.S. PATENT DOCUMENTS

| | | | |
|---|---|---|---|
| 3,813,124 A * | 5/1974 | Roland | B60P 1/283 298/17 B |
| 5,186,483 A | 2/1993 | Sheppard | |
| 5,351,413 A * | 10/1994 | Bruner | F01L 1/20 33/611 |
| 5,405,181 A * | 4/1995 | Watkins | B60P 1/283 298/17 B |
| 2002/0109393 A1 | 8/2002 | Brooks, Jr. | |

FOREIGN PATENT DOCUMENTS

| | | |
|---|---|---|
| CN | 202806494 U | 3/2013 |
| CN | 203358678 | 12/2013 |
| CN | 203372303 | 1/2014 |
| CN | 203854438 | 10/2014 |
| CN | 205075692 U | 3/2016 |
| CN | 206475789 U | 9/2017 |
| CN | 206983824 U | 2/2018 |
| CN | 208760490 U | 4/2019 |

OTHER PUBLICATIONS

Photograph dated Sep. 19, 2017.

* cited by examiner

*Primary Examiner* — D Glenn Dayoan
*Assistant Examiner* — Sunsurraye Westbrook
(74) *Attorney, Agent, or Firm* — Procopio, Cory, Hargreaves & Savitch LLP

(57) ABSTRACT

A safety assembly for off-highway trucks. The safety assembly can include a bracket and an arm. The arm can be coupled to the bracket via a pivot pin. The arm can rotate about the pivot pin. In preparation for operation of the off-highway truck the arm can be rotated around the pivot pin and held in a first position by a positioning pin that is placed at a first position between a left plate and a right plate of the bracket. In preparation for service of the off-highway truck the arm can be rotated around the pivot pin and held in a second position by the positioning pin placed at a second position between the left plate and right of the bracket.

20 Claims, 8 Drawing Sheets

SAFETY ASSEMBLY FOR OFF-HIGHWAY TRUCK

TECHNICAL FIELD

The present disclosure generally pertains to machines. More particularly this disclosure is directed toward a safety assembly for an off-highway truck.

BACKGROUND

When making repairs, performing routine service or maintenance or doing other work on an off-highway truck, it is frequently desirable to put the truck body in a raised position in order to make access to certain components located beneath the truck body easier. It is of extreme importance that the body be prevented from returning or dropping to its lowered position during this work in order to ensure the safety of any person performing the work. As a consequence, various techniques have been employed in the past for holding a truck body in its raised position when repairs or routine maintenance are being performed on the off-highway truck.

U.S. Pat. No. 6,471,299 to Brookes et. al. describes a dump truck with a mooring device for maintaining a body of the truck in a raised position when the truck is being serviced. The mooring device utilizes two tension members or cables and includes a load distribution mechanism so as to prevent one of the tension members from carrying a substantially greater tensile load than the other member.

The present disclosure is directed toward overcoming one or more of the problems discovered by the inventors or that are known in the art.

SUMMARY

A safety assembly for an off-highway truck is disclosed herein. The safety assembly includes a bracket. The bracket includes a left plate, a right plate, and a stiffener plate. The left plate includes a left pivot pin hole extending through the left plate and shaped to receive a pivot pin. The plate further includes a first left positioning pin/bolt hole extending through the left plate and shaped to receive a positioning pin or a bolt. The right plate is spaced from the left plate and oriented substantially parallel to the left plate. The right plate includes a right pivot pin hole extending through the right plate. The right pivot pin hole is aligned with the left pivot pin hole is shaped to receive the pivot pin. The right plate further includes a first right positioning pin/bolt hole extending through the right plate. The first right positioning pin/bolt hole is aligned with the first left positioning pin/bolt hole and is shaped to receive the positioning pin/bolt. The stiffener plate is positioned adjacent to the left plate and the right plate distal to the left pivot pin hole and right pivot pin hole.

The safety assembly further includes an arm. The arm includes a first plate and a second plate. The first plate includes a first plate front end and a first plate back end. The first plate back end is opposite from the first plate front end. The first plate further includes a first plate top surface and a first plate bottom surface. The first plate top surface extends longitudinally from adjacent the first plate front end to adjacent the first plate back end. The first plate bottom surface is opposite from the first plate top surface. The first plate further includes a coupling hole positioned proximate to the first plate front end. The coupling hole is shaped to couple with a fastening mechanism. The second plate extends from proximate to the first plate back end. The second plate includes a second plate top surface oriented substantially orthogonal to the first plate top surface, The second plate is shaped to be positioned between the left plate and the right plate of the bracket. The second plate shaped to hingeably engage with the pivot pin.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Furthermore, some of the features and surfaces have been left out or exaggerated for clarity and ease of explanation.

Figure 1:
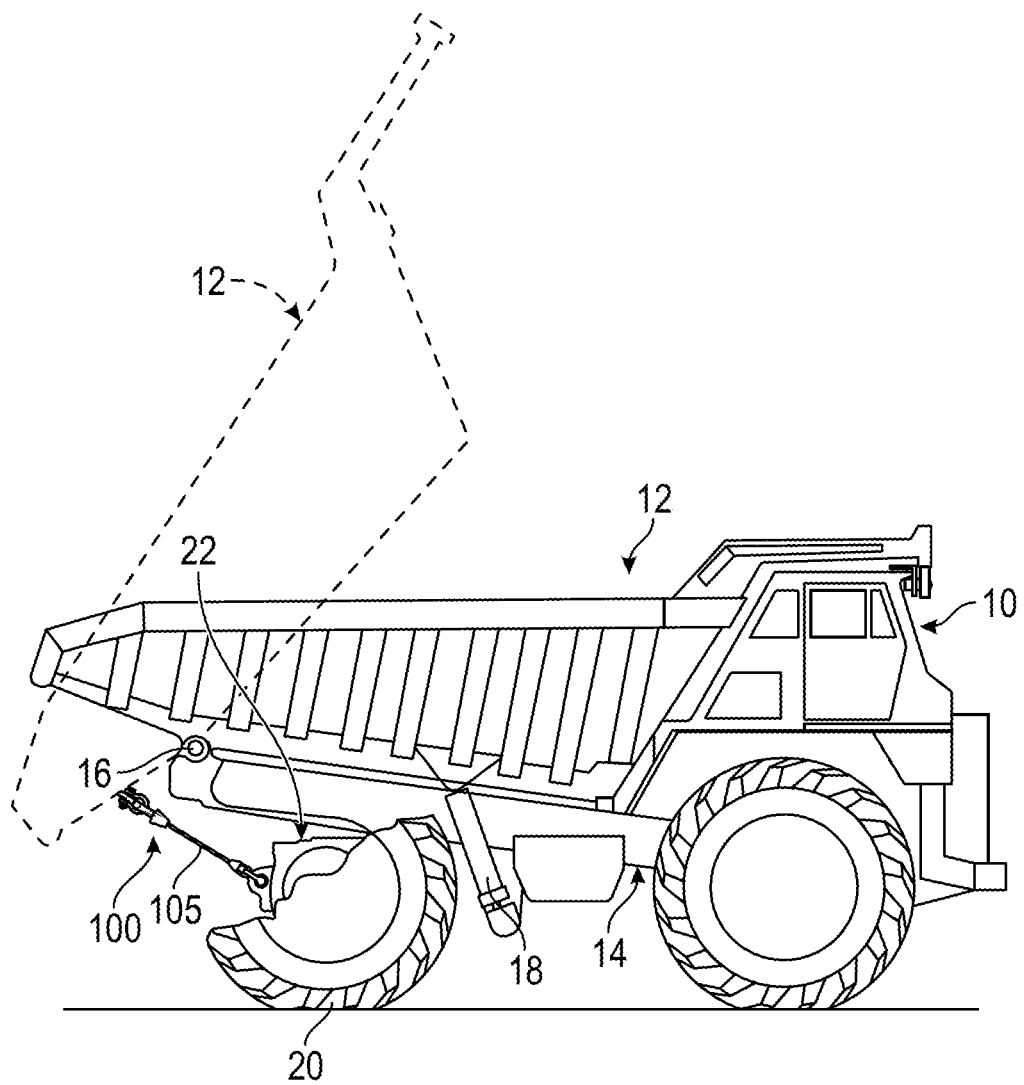
FIG. 1 is an illustration of a an exemplary off-highway truck with an exemplary safety assembly.

FIG. 1 is an illustration of a machine. Where the drawing includes multiple instances of the same feature, for example tires 20 in the front and rear of the machine, the reference number is only shown in connection with one instance of the feature to improve the clarity and readability of the drawing. This also true in other drawings which include multiple instances of the same feature. The machine 10 can sometimes be referred to as an off-highway truck and for example may be a large off-highway ore hauling truck. The machine 10 has a body 12, sometimes referred to as a truck body, pivotally mounted to the rear portion of a chassis 14 about a laterally extending pivot axis 16. A pair of hydraulic lift or hoist cylinders 18 may be employed for raising and lowering the body 12 about the pivot axis 16 between a lowered position (shown in solid lines in FIG. 1) and a raised position (shown in dotted lines in FIG. 1). The rear end of the chassis 14 is supported by left and right hand sets of tires 20, which are operatively connected to a drive axle and powertrain 22 that are contained within an axle housing.

The machine 10 can include a safety assembly 100 (shown in solid lines for clarity) which can be used for maintaining the body 12 of the machine 10 in its raised position, as depicted in dotted lines in FIG. 1. The safety assembly 100 can include a tension member 105, sometimes referred to as a cable. The tension member 105 is capable of carrying a high tensile load and together is sufficient to hold the body in its raised position. The tension member 105 can be constructed from steel wire cable. However, steel chain, steel rods or strapping of Kevlar® or other suitable material may be used in place of the steel cable and their use is contemplated and within the scope of the present disclosure. The steel cable is selected by its tensile rating in connection with the particular weight configuration of the body and the down force produced by the hoist cylinders that the cables are intended to restrain.

Figure 2:
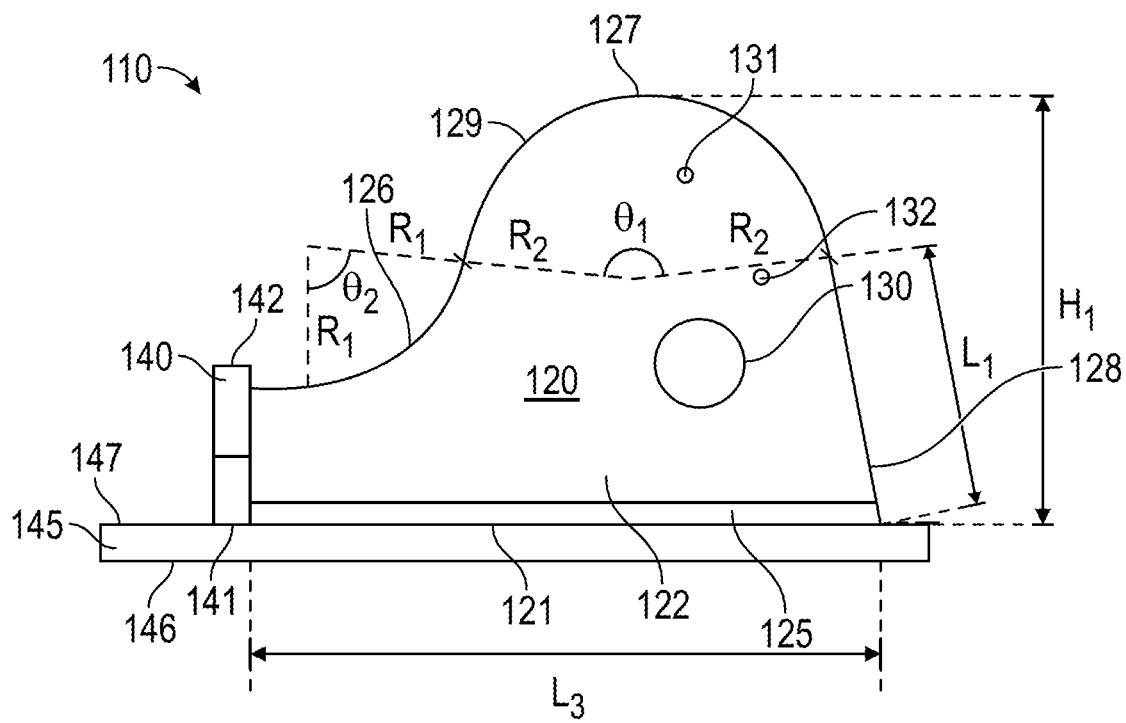
FIG. 2 is a side view of an exemplary bracket from FIG. 1.

FIG. 2 is a side view of an exemplary bracket from FIG. 1. A bracket 110 can include a right plate 120. The right plate 120 can include a right bottom side 121 and a right outward surface 122.

The right plate 120 can have a right upper surface 129. The right upper surface 129 can extend from an end of the right bottom side 121 to the opposite end of the right bottom side 121. The right upper surface 129 can include a first right radial portion 126 having a radius R1, a second right radial portion 127 having a radius R2, and a first right linear portion 128 having a length L1. The first right radial portion 126 can be a concave portion. The second right radial portion 127 can be a convex portion. The second right radial portion 127 can extend from adjacent the first right radial portion 126. The first right linear portion 128 can extend from adjacent the second right radial portion 127 to adjacent the bottom plate 145.

Radius R1 can range from 60 mm to 100 mm. Radius R2 can range from 60 mm to 100 mm. Length L1 can range from 100 mm to 150 mm. The right plate 120 can have a length L3. Length L3 can range from 200 mm to 325 mm. The first right radial portion 126 can include an arc length that extends at an angle θ1 around the center point of R1. Angle θ1 can range from 150 mm to 180 mm. The second right radial portion 127 can include an arc length that extends at an angle θ2 around the center point of R2. Angle θ2 can range from 60 mm to 90 mm.

The bracket 110 can include a right pivot pin hole 130, a first right positioning pin/bolt hole 131, and a second right positioning pin/bolt hole 132. In the embodiment the first right positioning pin/bolt hole 131 and the second right positioning pin/bolt hole 132 are significantly smaller than the right pivot pin hole 130. The right pivot pin hole 130 can range in diameter from 38 mm to 45 mm. In an embodiment the right pivot pin hole is approximately 40 mm in diameter. The first right positioning pin hole 131 can range in diameter from 5 mm to 10 mm. The second right positioning pin hole 132 can range in diameter from 5 mm to 10 mm.

In other examples the first right positioning pin/bolt hole 131 and the second right positioning pin/bolt hole 132 are similar in size or smaller than the right pivot pin hole 130.

The bracket 110 can include a stiffener plate 140 positioned adjacent to the right plate 120. The stiffener plate can include a stiffener plate bottom side 141 and a stiffener plate top side 142 opposite the stiffener plate bottom side 141. In an embodiment the stiffener plate 140 can have a thickness of approximately 16 mm.

The bracket 110 can include a bottom plate 145. The bottom plate 145 can be configured to be mounted to the truck body 12. The bottom plate 145 can include a bottom surface 146 shaped to contact the truck body 12 along all or the majority of the bottom surface 146. The bottom plate 145 can include a top surface 147 opposite the bottom surface 146.

In an embodiment the right plate 120 extends from the top surface 147 of the bottom plate 145. In other words, the right bottom side 121 can be located adjacent to the top surface 147 of the bottom plate 145. The right plate 120 can be welded to the bottom plate 145. In an example the bracket 110 can include a fillet 125 adjacent to the right bottom side 121 and the top surface 147.

In an embodiment the stiffener plate 140 extends from the top surface 147 of the bottom plate 145. In other words the stiffener plate bottom side 141 can be located adjacent to the top surface 147 of the bottom plate 145. The stiffener plate 140 can be welded to the bottom plate 145 and the right plate 120.

The bracket 110 may comprise metal such as grade 80 steel or better, and other alloys. In an embodiment the right plate 120, stiffener plate 140, and the bottom plate 145 can comprise the same material.

Figure 3:
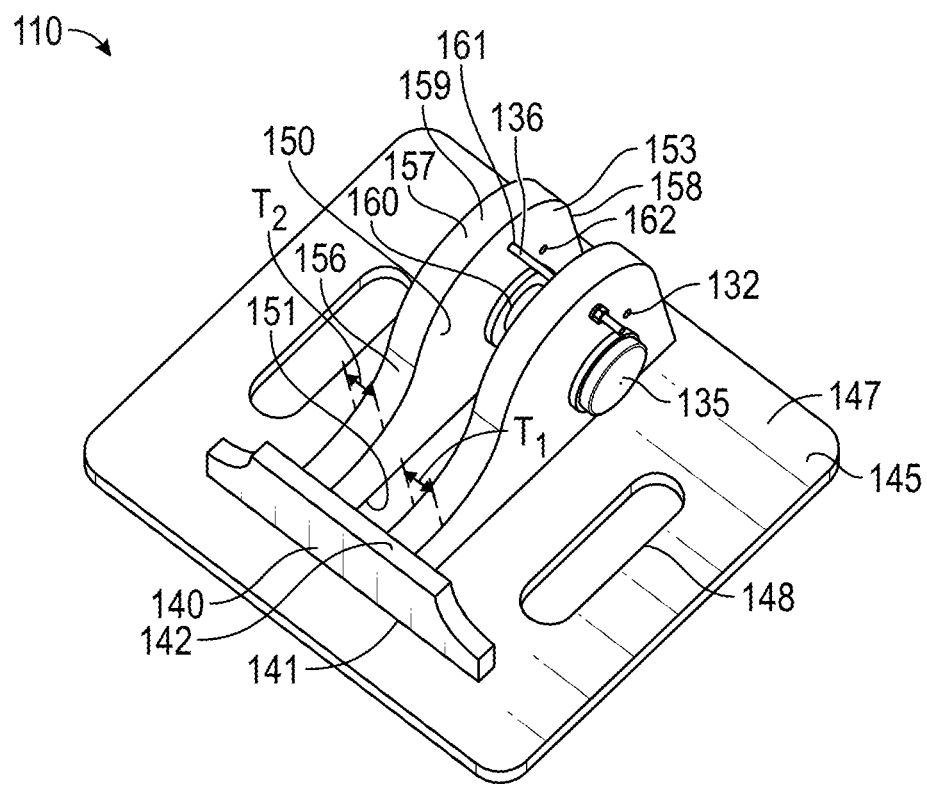
FIG. 3 is a perspective view of the exemplary bracket from FIG. 2.

FIG. 3 is a perspective view of the exemplary bracket from FIG. 2. In an embodiment the bracket 110 includes a left plate 150 spaced from and oriented substantially parallel to the right plate 120. The left plate 150 may include the same or similar features as the right plate 120 shown here in FIG. 2 and other figures. The left plate 150 may include a left bottom side 151, a first left linear portion 155, a first left radial portion 156, a second left radial portion 157, a second left linear portion 158, a left upper surface 159, a left pivot pin hole 160, a first left positioning pin/bolt hole 161, and a second positioning pin/bolt hole 162. The description of the left bottom side 151, the first left linear portion 155, the first left radial portion 156, the second left radial portion 157, the second left linear portion 158, the left upper surface 159, the left pivot pin hole 160, the first left positioning pin/bolt hole 161, and the second left positioning pin/bolt hole 162 may be the same or similar as right bottom side 121, the first right radial portion 126, the second right radial portion 127, the first right linear portion 128, the right upper surface 129, the right pivot pin hole 130, the first right positioning pin/bolt hole 131, and the second right positioning pin/bolt hole 132 respectfully.

The left plate 150 can have a left inward surface 153 that faces towards the right plate 120. The left plate 150 can have a thickness T2 within the range of 20 mm to 30 mm. In an embodiment the left plate 150 can have a thickness T2 of approximately 25 mm. The right plate 120 can have a thickness T1 within the range of 20 mm to 30 mm. In an embodiment the right plate 120 can have a thickness T1 of approximately 25 mm.

The bracket 110 can include a pivot pin 135 and a positioning pin/bolt 136. The right pivot pin hole 130 and the left pivot pin hole 160 can be aligned with each other and shaped to receive the pivot pin 135. The pivot pin 135 can have a diameter ranging from 38 mm to 45 mm. The pivot pin 135 can have a diameter that is approximately 40 mm.

The first right positioning pin/bolt hole 131 and the first left positioning pin/bolt hole 161 can be aligned with each other and shaped to receive the positioning pin 136. The positioning pin/bolt 136 can have a diameter ranging from 5 mm to 10 mm.

The bottom plate 145 can have slots 148. The slot 148 can be used to facilitate mounting of the bracket 110 to the truck body 12. The slot 148 can allow the bottom surface 146 (shown on FIG. 2) of the bottom plate 145 to contact the truck body 12 more uniformly than without the slots 148. For example, to accommodate protrusions and uneven geometry of the truck body 12.

In an embodiment, the stiffener plate 140 can be positioned adjacent to the left plate 150 and the right plate 120 distal to the right pivot pin hole 130 and the left pivot pin hole 130.

Figure 4:
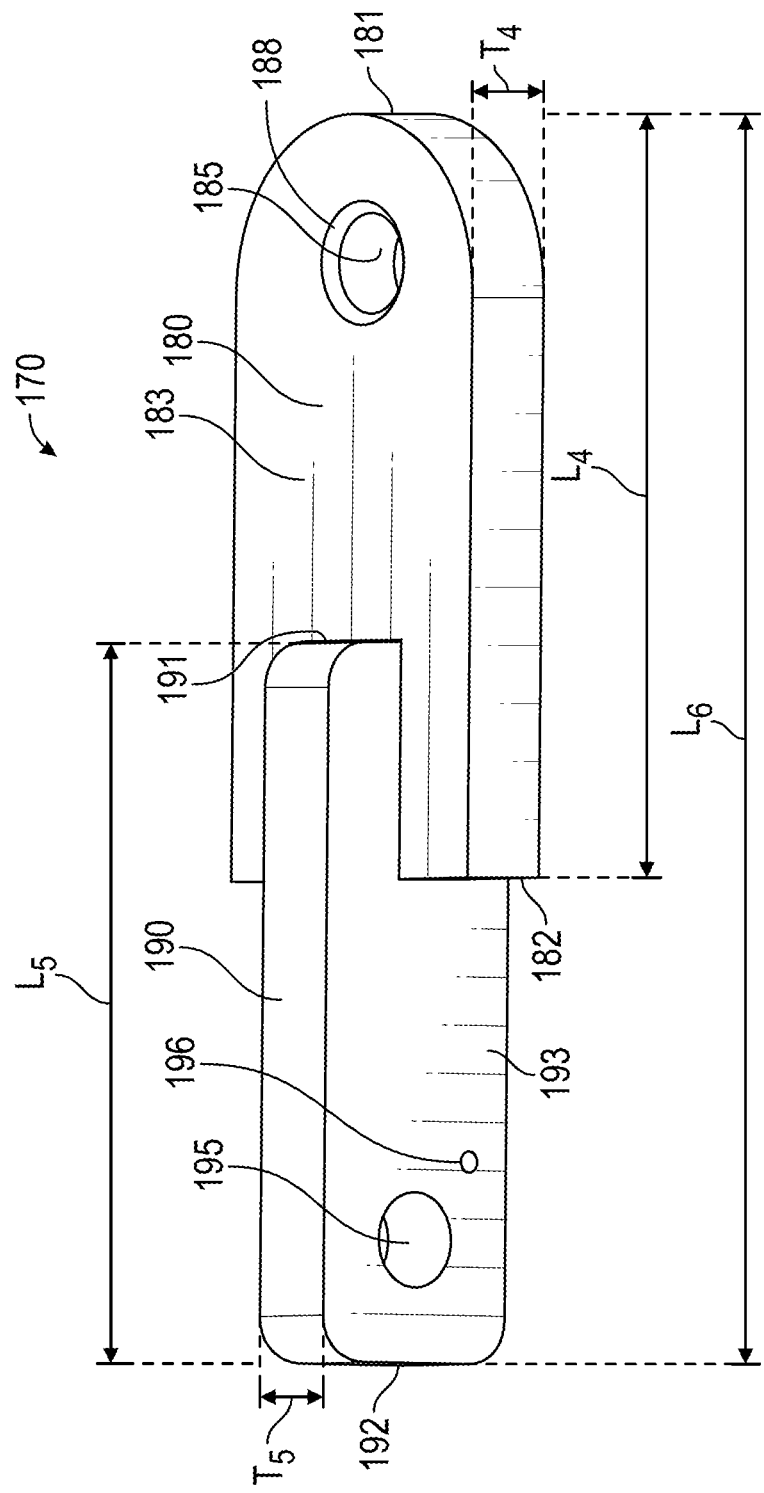
FIG. 4 is a perspective view of an exemplary arm from FIG. 1.

FIG. 4 is a perspective view of an exemplary arm from FIG. 1. An arm 170 can include a first plate 180 and a second plate 190. The first plate 180 can have a first plate front end 181 and a first plate back end 182 opposite from the first plate front end 181. The first plate 180 can be shaped having a convex curve. The first plate front end 181 can have a convex curve shape. The first plate 180 can have a longitudinal length L4 from the first plate back end 182 to the first plate front end 181. The length L4 can range from 250 mm to 350 mm. The first plate 180 can have a thickness T4 that is the distance between the first plate top surface 183 and a first bottom surface 184 (shown on FIG. 5). The thickness T4 can range from 38 mm to 50 mm. In an embodiment the thickness T4 is approximately 40 mm.

The first plate 180 can have a first plate top surface 183 extending from the first plate front end 181 to the first plate back end 182. The first plate 180 can have a coupling hole 185 located proximate to the first plate front end 181. In an embodiment the coupling hole 185 includes a chamfer 188 adjacent to the first plate top surface 183. In an embodiment the coupling hole 185 diameter can range from 40 mm to 60 mm.

The second plate 190 can extend from proximate the first plate back end 182. The second plate 190 can have a second plate front end 191 proximate to the first plate back end 182 of the first plate 180. The second plate 190 can have a second plate back end 192 opposite from the second plate front end 191. The second plate 190 can include a second top surface 193 and a second bottom surface 194 (shown on FIG. 6). The second plate 190 can be positioned and attached to the first plate 180 such that the second top surface 193 is orthogonal to the first plate top surface 183.

The second plate 190 can include a pivot pin hole 195. The pivot pin hole 195 can be located proximate to the second plate back end 192. The pivot pin hole 195 can have a diameter that ranges from 38 mm to 45 mm. The pivot pin hole 195 can be shaped to receive the pivot pin 135 described in FIG. 3. The pivot pin hole 195 can extend though the second plate 190 in a direction substantially orthogonal to the coupling hole 185.

The second plate 190 can have a longitudinal length L5 that can extend from the second plate front end 191 to the second plate back end 192. The length L5 can range from 250 mm to 350 mm. The second plate 190 can have a thickness T5 that is the distance between the second top surface 193 and the second bottom surface 194 (shown on FIG. 6). The thickness T5 can range from 40 mm to 60 mm.

The second plate 190 can include a positioning pin/bolt hole 196. The positioning pin/bolt hole 196 can be located proximate to the second plate back end 192. The positioning pin/bolt hole 196 can be spaced from and proximate to the pivot pin hole 195. The positioning pin hole 196 can have a diameter that ranges from 5 mm to 10 mm. The positioning pin/bolt hole 196 can be shaped to receive the positioning pin/bolt 136 described in FIG. 3.

The arm 170 can have a longitudinal length L6 that can extend from the second plate back end 192 to the first plate front end 181. The length L6 can range from 500 mm to 550 mm.

Figure 5:
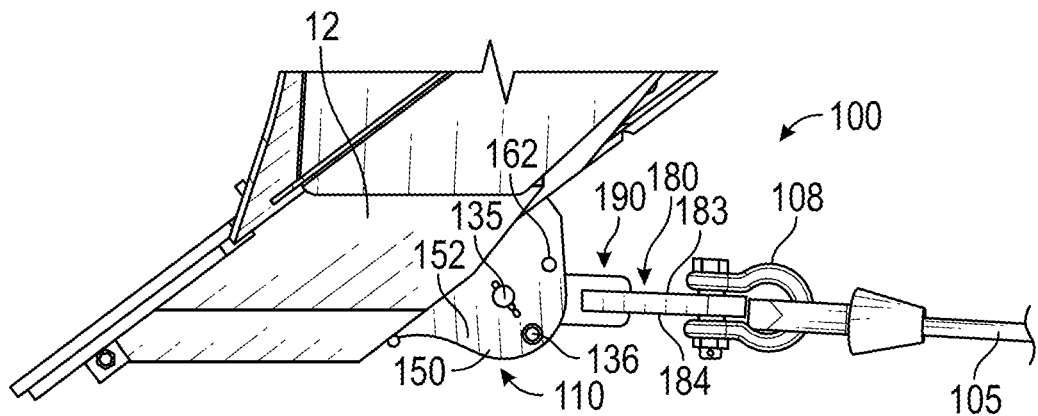
FIG. 5 is a side view of the safety assembly from FIG. 1.

FIG. 5 is a side view of the safety assembly from FIG. 1. The safety assembly 100 can be mounted to the truck body 12 at the bracket 110. The bracket 110 can be mounted to the truck body 12, for example by welding (not shown) or by fasteners (not shown).

The safety assembly 100 can include the tension member 105 and a fastening mechanism 108. The fastening mechanism 108 can be configured to couple the tension member 105 to the first plate 180 of the arm 170. In an embodiment the fastening mechanism 108 is configured to couple with the coupling hole 185 (shown on FIG. 4) of the arm 170. The fastening mechanism 108 can be a clevis, an anchor pin, fasteners, welding, or comprise other fastening methods.

The first plate 180 can have a first bottom surface 184 opposite from the first plate top surface 183. The distance from the first bottom surface 184 to the first plate top surface 183 can be the thickness T4 shown in FIG. 4.

The left plate 150 can include a left outward surface 152.

Figure 6:
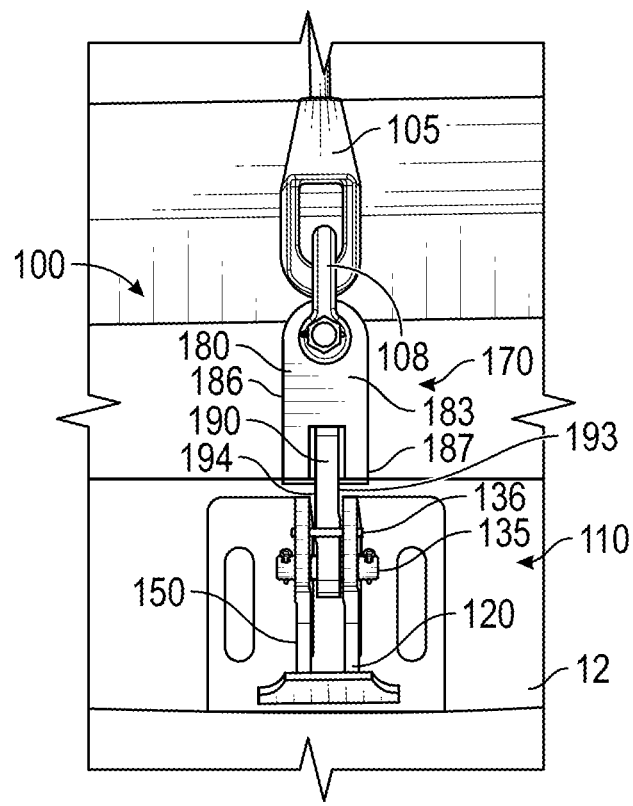
FIG. 6 is a bottom view of the safety assembly from FIG. 5, oriented up towards the bottom of the truck body.

FIG. 6 is a bottom view of the safety assembly from FIG. 5, oriented up towards the bottom of the truck body. The arm 170 can be coupled to the bracket 110 via the pivot pin 135. In an embodiment the second plate 190 can hingeably engage with the pivot pin 135. The pivot pin 135 can be positioned through the left pivot pin hole 160 (shown on FIG. 3) of the left plate 150, through the pivot pin hole 195 (shown on FIG. 4) of the second plate 190, and through the right pivot pin hole 130 (shown on FIGS. 2 and 3) of the right plate 120. The arm 170 can be rotatable about the pivot pin 135 via the pivot pin hole 195

The positioning pin/bolt 136 can be positioned through the first left positioning pin/bolt hole 161 (shown on FIG. 3) and the first right positioning pin/bolt hole 131 (shown on FIG. 2).

The first plate 180 can have a first left side 186 and a first right side 187 opposite the first left side 186. The first left side 186 can extend from adjacent the first plate top surface 183 to adjacent the first bottom surface 184. The first left side 186 can extend from adjacent the first plate back end 182 towards the first front end 181.

The first right side 187 can extend from adjacent the first plate top surface 183 to adjacent the first bottom surface 184. The first right side 187 can extend from adjacent the first plate back end 182 towards the first plate front end 181. In an embodiment the second plate front end 191 of the second plate 190 can intersect the first plate 180 substantially equidistant from the first left side 186 and the first right side 187.

In an embodiment, the second top surface 193 and the second bottom surface 194 are substantially orthogonal to the first plate top surface 183.

Referring back to FIG. 5, the positioning pin/bolt 136 can resist rotational movement of the arm 170 about the pivot pin 135 due to vertical forces such as gravity. In other words, the arm 170 can rest on the positioning pin/bolt 136. In an embodiment the positioning pin/bolt 136 positions the arm 170 to be generally horizontal while the truck body 12 is fully raised in the service position.

Figure 7:
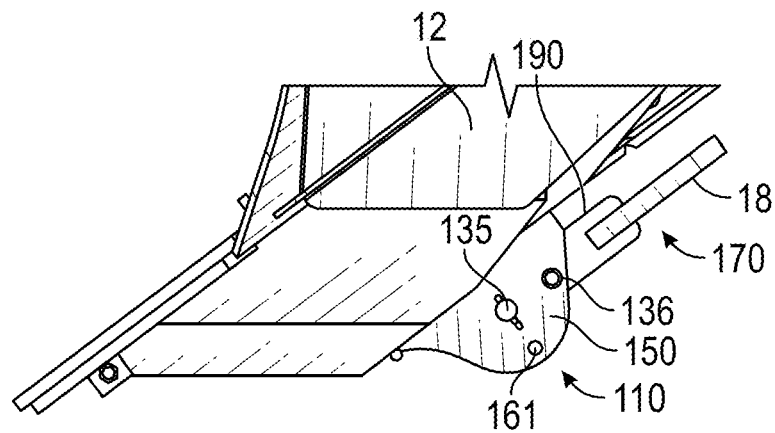
FIG. 7 is a side view of the safety assembly from FIG. 1 with the arm in a raised position.

FIG. 7 is a side view of the safety assembly from FIG. 1 with the arm in a raised position. The arm 170 can be positioned approximately parallel with the bottom of the truck body 12 adjacent the bracket 110. The positioning pin 136 can be placed through the second left positioning pin hole 162 (shown in FIG. 3) and can be place through the second right positioning pin hole 132. In an embodiment the positioning pin 136 can also be positioning through the positioning pin hole 196 (shown in FIG. 4) of the second plate 190 of the arm 170. The positioning pin 136 can resist the rotational movement of the arm 170 about the pivot pin 135. In an embodiment the positioning pin holds the arm 170 up to be proximate with the and approximately parallel with the truck body 12.

Figure 8:
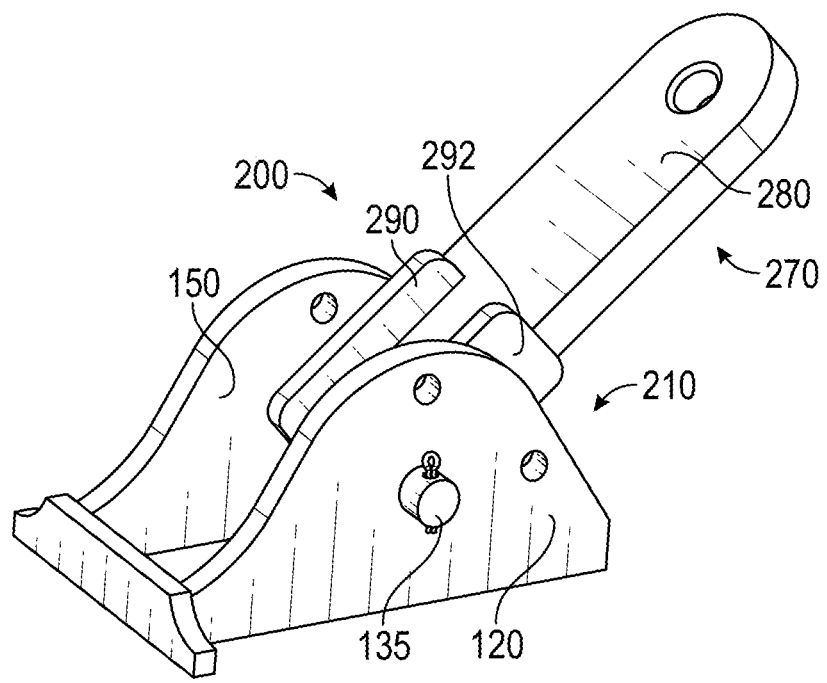
FIG. 8 is a perspective view of a further embodiment of the safety assembly.

FIG. 8 is a perspective view of a further embodiment of the safety assembly.

Structures and features previously described in connection with earlier described embodiments may not be repeated here with the understanding that, when appropriate, that previous description applies to the embodiment depicted in FIG. 8. Additionally, the emphasis in the following description is on variations of previously introduced features or elements. Also, some reference numbers for previously descripted features are omitted.

The safety assembly 200 can include a bracket 210 and an arm 270. The bracket 210 can have the same or similar features as bracket 110, but with the bottom plate 145 removed.

The arm 270 can have a first plate 280, a second plate 290, and a third plate 292. The third plate 292 can be spaced from and substantially parallel to the second plate 290.

The second plate 290 and the third plate 292 can extend from proximate the first plate back end 182. The second plate 290 and the third plate 292 can extend substantially transverse from the first plate top surface 183. The second plate 290 and the third plate 292 can be shaped to receive the pivot pin 135 and the positioning pin 136 (shown in FIG. 3). The second plate 290 and the third plate 292 can be shaped to rotate about the pivot pin 135.

Figure 9:
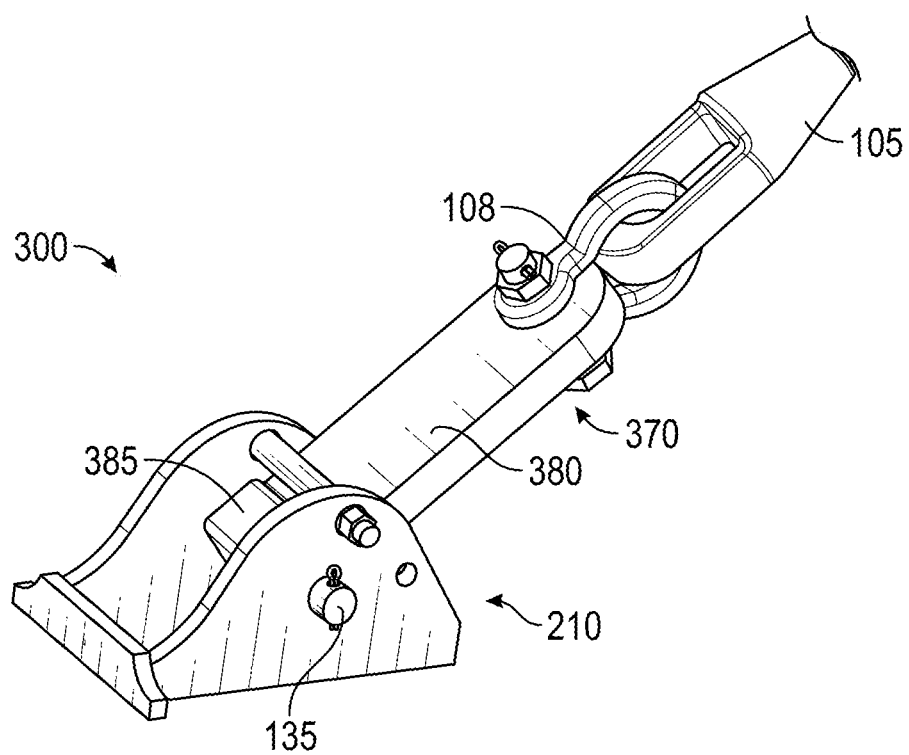
FIG. 9 is a perspective view of a further embodiment of the safety assembly.

FIG. 9 is a perspective view of a further embodiment of the safety assembly. Structures and features previously described in connection with earlier described embodiments may not be repeated here with the understanding that, when appropriate, that previous description applies to the embodiment depicted in FIG. 9. Additionally, the emphasis in the following description is on variations of previously introduced features or elements. Also, some reference numbers for previously descripted features are omitted.

A safety assembly 300 can include the tension member 105, the fastening mechanism 108, an arm 370, and a bracket 210. The arm 370 can include a first plate 380 that includes an enlarged portion 385. The enlarged portion 385 can be disposed proximate to the pivot pin 135 and be thicker than the remaining portion of the first plate 380.

Figure 10:
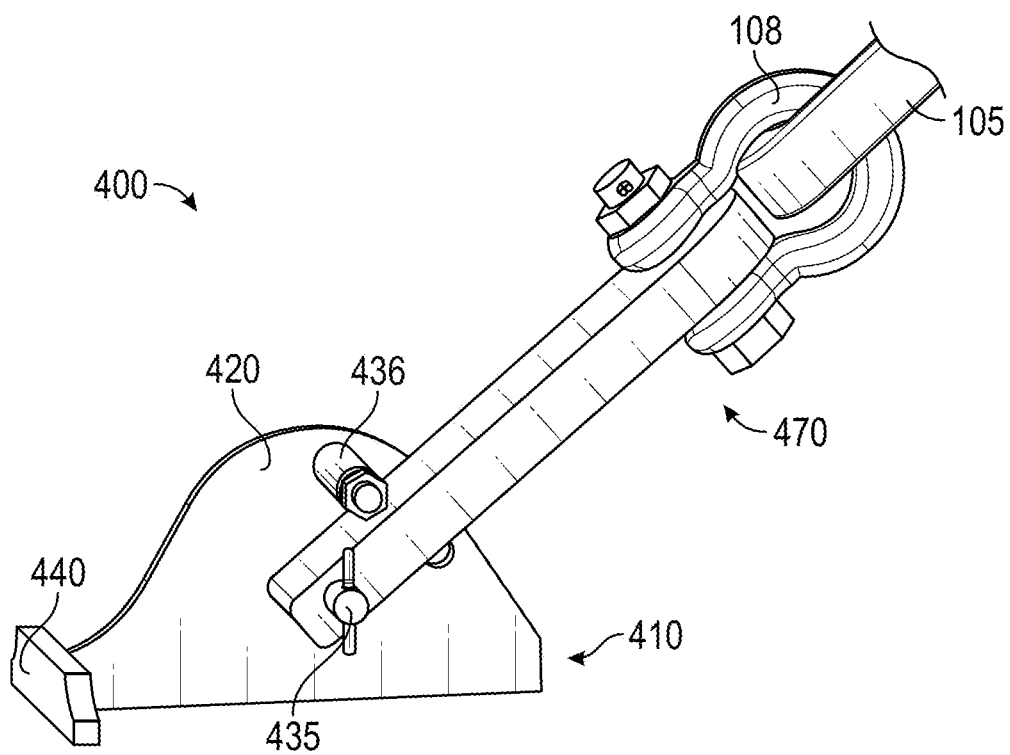
FIG. 10 is a perspective view of a further embodiment of the safety assembly.

FIG. 10 is a perspective view of a further embodiment of the safety assembly. Structures and features previously described in connection with earlier described embodiments may not be repeated here with the understanding that, when appropriate, that previous description applies to the embodiment depicted in FIG. 10. Additionally, the emphasis in the following description is on variations of previously introduced features or elements. Also, some reference numbers for previously descripted features are omitted.

A safety assembly 400 can include the tension member 105, the fastening mechanism 108, an arm 470, and a bracket 410. The arm 470 can also be referred to as a first plate. The bracket 410 can comprise of a single plate 420 (sometimes referred to as right plate) and a stiffener plate 440. The arm 470 can be coupled to the right plate 420 via a pivot pin 435. The safety assembly may include a positioning pin 436.

Figure 11:
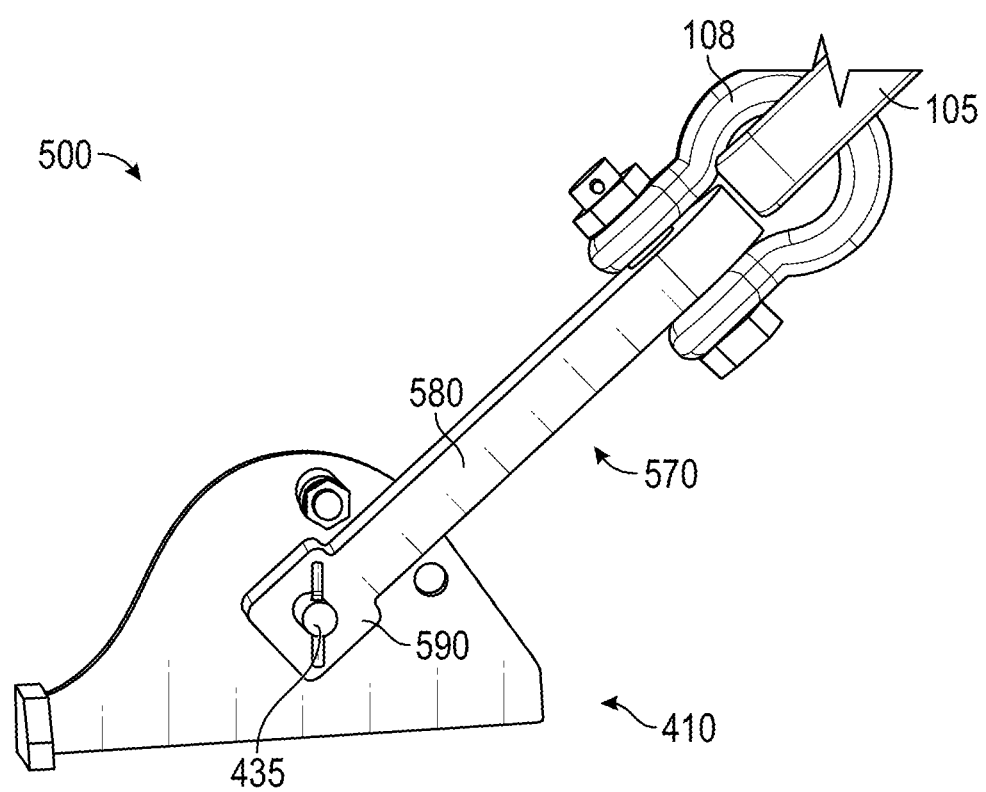
FIG. 11 is a perspective view of a further embodiment of the safety assembly.

FIG. 11 is a perspective view of a further embodiment of the safety assembly. Structures and features previously described in connection with earlier described embodiments may not be repeated here with the understanding that, when appropriate, that previous description applies to the embodiment depicted in FIG. 11. Additionally, the emphasis in the following description is on variations of previously introduced features or elements. Also, some reference numbers for previously descripted features are omitted.

A safety assembly 500 can include the tension member 105, the fastening mechanism 108, an arm 570, and a bracket 410. The arm 570 can include a first plate 580. The first plate 580 can include an enlarged portion 590, shaped to receive the pivot pin 435.

Figure 12:
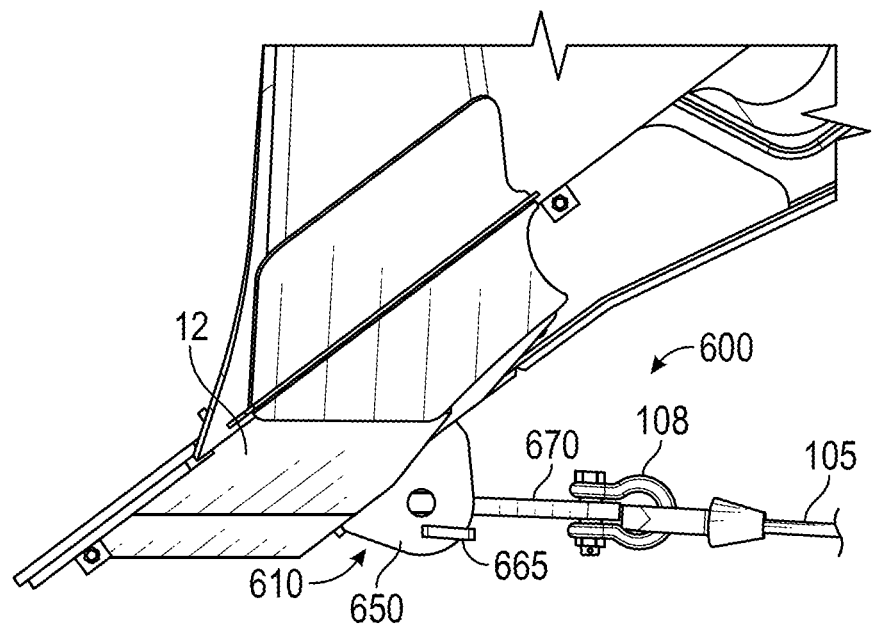
FIG. 12 is a side view of a further embodiment of the safety assembly.

FIG. 12 is a side view of a further embodiment of the safety assembly. Structures and features previously described in connection with earlier described embodiments may not be repeated here with the understanding that, when appropriate, that previous description applies to the embodiment depicted in FIG. 12. Additionally, the emphasis in the following description is on variations of previously introduced features or elements. Also, some reference numbers for previously descripted features are omitted.

A safety assembly 600 can include the tension member 105, the fastening mechanism 108, an arm 670, and a bracket 610. The arm 670 can be referred to as a first plate.

The bracket 610 can include a left plate 650 and a stopper plate 665 attached to the left plate. The stopper plate 665 can remain attached in a fixed position.

Figure 13:
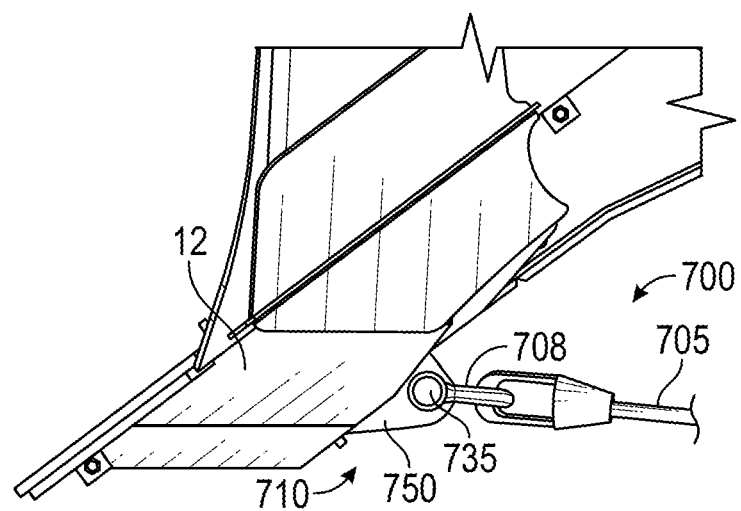
FIG. 13 is a side view of a further embodiment of the safety assembly.

FIG. 13 is a side view of a further embodiment of the safety assembly. Structures and features previously described in connection with earlier described embodiments may not be repeated here with the understanding that, when appropriate, that previous description applies to the embodiment depicted in FIG. 12. Additionally, the emphasis in the following description is on variations of previously introduced features or elements. Also, some reference numbers for previously descripted features are omitted.

A safety assembly 700 can include the tension member 705, the fastening mechanism 708, and a bracket 710. The fastening mechanism 708 can also be referred to as an arm. The tension member 705 can be longer than the tension member 105.

The bracket 710 can include a left plate 750 and a pivot pin 735 positioned through the left plate 750.

INDUSTRIAL APPLICABILITY

The safety assembly 100, 200, 300, 400, 500, 600, 700 constructed in accordance with the present disclosure is effective in holding a dump body 12 of a large off-highway truck 10 in its raised position when the truck 10 is being worked on in order to provide workers greater access to various components of the truck 10 during repairs, service, or other maintenance of the truck.

Current safety assemblies are susceptible to being damaged in the field due to fixed position of some of the safety assembly features during a dump event. Some sites experience severe damages to this safety feature on truck body 12 depending on berm heights and its operational practices.

To use the safety assembly 100, 200, 300, 400, 500, 600, 700, the dump body 12 is raised to its fully raised position. In such fully raised position, the tension member 105, 705 can be coupled to the powertrain 22 and the fastening mechanism 108, 708. The fastening mechanism 108 can couple to the arm 170, 270, 370, 470, 570, 670. The arm 170, 270, 370, 470, 570, 670, 708 can couple to the bracket 110,

210, 410, 610, 710 via the pivot pin 135, 435, 735. The bracket 110, 210, 410, 610, 710 can be mounted to the truck body 12.

The arm 170, 270, 370, 470, 570, 670, 708 can to be positioned during operation of the truck 10 to avoid damage in the field and can be positioned while in a raised position of the truck 10 to assist the coupling of components of the safety assembly 100, 200, 300, 400, 500, 600, 700.

In preparation for operation of the off-highway truck 10 the arm 170, 270, 370, 470, 570, 670 can be rotated around the pivot pin 135, 435 and held in a first position (FIG. 5) by a positioning pin 136, 436 that is placed at first position or first positioning pin holes 131, 161 of the right plate 120, 420 and the left plate 150 of the bracket 110, 210, 410. In preparation for service of the off-highway truck 10 the arm can be 170, 270, 370, 470, 570, 670 rotated around the pivot pin 135, 435 and held in a second position (FIG. 7) by the positioning pin 136, 436 or stopper plate 665, that is placed at a second position or second positioning pin holes 132, 162 of the right plate 120, 420 and the left plate 150, 650 of the bracket 110, 210, 410, 610

The positioning pin/bolt 136, 436 can be shaped, sized, and made of materials that allow it to shear prior to bending of the arm 170 and bracket 110. For example, in the event that debris wedges between some of the components of the safety assembly 100, 200, 300, 400, 500, 600, 700 or for example sudden unintended forces are acted against the safety assembly 100, 200, 300, 400, 500, 600, 700 the positioning pin/bolt 136 will brake/shear first and may provide relief against the forces.

The stiffener plate 140, 440 can provide additional stiffness to the bracket 110, 210, 410. The stiffener plate 140, 440 can improve the stress distribution to the truck body 12 and provide a larger area to transfer stress.

Although this disclosure has been shown and described with respect to detailed embodiments thereof, it will be understood by those skilled in the art that various changes in form and detail thereof may be made without departing from the spirit and scope of the claimed disclosure. Accordingly, the preceding detailed description is merely exemplary in nature and is not intended to limit the disclosure or the application and uses of the disclosure. In particular, the described embodiments are not limited to use in conjunction with a particular type of machine 10. For example, the described embodiments may be applied to machines employed in mining, construction, farming, and power generation applications, or any variant thereof. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

It will be understood that the benefits and advantages described above may relate to one embodiment or may relate to several embodiments. The embodiments are not limited to those that have any or all of the stated benefits and advantages.

What is claimed is:

1. A safety assembly for an off-highway truck with a powertrain, a tension member coupled to the powertrain, a fastening mechanism coupled to the tension member, a bracket with a left plate and a right plate, and a pivot pin extending between the left plate and the right plate of the bracket, the safety assembly comprising:
    a first plate having
        a first plate front end,
        a first plate back end opposite from the first plate front end,
        a first plate top surface extending longitudinally from adjacent the first plate front end to adjacent the first plate back end,
        a first plate bottom surface opposite from the first plate top surface, and
        a coupling hole positioned proximate to the first plate front end, the coupling hole shaped to couple with the fastening mechanism; and
    a second plate extending from proximate to the first plate back end, the second plate having a second plate top surface oriented substantially orthogonal to the first plate top surface, the second plate shaped to be positioned between the left plate and the right plate of the bracket, the second plate shaped to hingeably engage with the pivot pin.

2. The safety assembly of claim 1, wherein the first plate further comprises:
    a first left side extending from adjacent the first plate top surface to adjacent the first bottom surface, the first left side extending from adjacent the first plate back end towards the first plate front end;
    a first right side is positioned opposite from the first left side, the first right side extending from adjacent the first plate top surface to adjacent the first bottom surface, the first right side extending from adjacent the first plate back end towards the first plate front end; and
    wherein the second plate intersects with the first plate substantially equidistant from the first left side and first right side.

3. The safety assembly of claim 1, wherein the second plate further comprises a pivot pin hole extending through the second plate in a direction substantially orthogonal to the coupling hole.

4. The safety assembly of claim 1, wherein the first plate has a concave shape at the front end.

5. The safety assembly of claim 1, wherein a distance between the first plate top surface and the first plate bottom surface is between 38 mm and 50 mm.

6. The safety assembly of claim 1, wherein the second plate further comprises a second plate back end opposite from the first plate front end, and wherein a distance between the second plate back end and the first plate front end is between 500 mm and 550 mm.

7. The safety assembly of claim 1, wherein the first plate and the second plate are welded together.

8. The safety assembly of claim 1, wherein the safety assembly further comprises a third plate spaced from and substantially parallel to the second plate, the third plate extending from proximate to the first plate back end, the third plate extending substantially transverse from the first plate top surface and the first plate bottom surface, the third plate shaped to be positioned between the left plate and the right plate of the bracket, the third plate shaped to hingeably engage with the pivot pin.

9. A bracket for an off-highway truck with a truck body to maintain a raised position of the truck body during maintenance of the off-highway truck, the bracket comprising:
    a left plate having
        a left pivot pin hole extending through the left plate and shaped to receive a pivot pin, and
        a first left positioning pin hole extending through the left plate and shaped to receive a positioning pin;
    a right plate spaced from the left plate and oriented substantially parallel to the left plate, the right plate having a right pivot pin hole extending through the right plate, the right pivot pin hole aligned with the left pivot pin hole, the right pivot pin hole shaped to receive the pivot pin, and a first right positioning pin hole extending through the right plate, the first right positioning pin hole aligned with the first left positioning pin hole, the first right positioning pin hole shaped to receive the positioning pin; and a stiffener plate positioned adjacent to the left plate and the right plate distal to the left pivot pin hole and the right pivot pin hole.

10. The bracket of claim 9, wherein the bracket further comprises:
a bottom plate configured to be mounted to the truck body and having
a bottom surface shaped to contact the truck body, and
a top surface opposite the bottom surface.

11. The bracket of claim 10, wherein the left plate, the right plate, and the stiffener plate extend substantially orthogonal from adjacent the top surface of the bottom plate.

12. The bracket of claim 9, wherein the first left positioning pin hole and the first right positioning pin hole are smaller than the left pivot pin hole and the right pivot pin hole respectively.

13. The bracket of claim 9, wherein the left plate further includes
a second left positioning pin hole spaced from the first left positioning pine hole, the second left positioning pin hole extending through the left plate; and
wherein the right plate further includes a second right positioning pin hole spaced from the first right positioning pin hole, the second right positioning pin hole extending through the right plate, the second right positioning pin hole aligned with the second left positioning pin hole.

14. The bracket of claim 10, wherein the stiffener plate includes a stiffener top side and a stiffener bottom side located adjacent to the top surface of the bottom plate, the stiffener top side shorter than the stiffener bottom side.

15. A safety assembly for an off-highway truck with a truck body and a powertrain, the safety assembly comprising:
a tension member configured to couple with the powertrain;
a fastening mechanism configured to couple with the tension member;
a pivot pin;
a positioning pin;
a bracket configured to mount to the truck body, the bracket including
a left plate having
a left pivot pin hole extending through the left plate and shaped to receive the pivot pin, and
a first left positioning pin hole extending through the left plate and shaped to receive the positioning pin,
a right plate spaced from and oriented substantially parallel to the left plate, the right plate having
a right pivot pin hole extending through the right plate, the right pivot pin hole aligned with the left pivot pin hole, the right pivot pin hole shaped to receive the pivot pin, and
a first right positioning pin hole extending through the right plate, the first right positioning pin hole aligned with the first left positioning pin hole, the first right positioning pin hole shaped to receive the positioning pin, and
a stiffener plate positioned adjacent to the left plate and the right plate; and
an arm shaped to hingeably engage with the pivot pin, the arm including
a first plate having
a first plate front end,
a first plate back end opposite from the first plate front end,
a first plate top surface extending from adjacent the first plate front end to adjacent the first plate back end,
a first plate bottom surface opposite from the first plate top surface, and
a coupling hole positioned proximate to the first plate front end, the coupling hole shaped to couple with the fastening mechanism, and
a second plate positioned proximate to the first plate back end, the second plate having a second plate top surface oriented substantially orthogonal to the first plate top surface, the second plate shaped to be positioned between the left plate and the right plate of the bracket.

16. The safety assembly of claim 15, wherein the positioning pin can be placed within the first left positioning pin hole and the first right positioning pin hole to reduce a rotational range of the arm about the pivot pin.

17. The safety assembly of claim 15, wherein the first plate further comprises:
a first left side extending from adjacent the first plate top surface to adjacent the first bottom surface, the first left side extending from adjacent the first plate back end towards the first plate front end;
a first right side is positioned opposite from the first left side, the first right side extending from adjacent the first plate top surface to adjacent the first bottom surface, the first right side extending from adjacent the first plate back end towards the first plate front end; and
wherein the second plate intersects with the first plate substantially equidistant from the first left side and first right side.

18. The safety assembly of claim 15, wherein the second plate further comprises a pivot pin hole extending through the second plate in a direction substantially orthogonal to the coupling hole.

19. The bracket of claim 15, wherein the bracket further comprises:
a bottom plate configured to be mounted to the truck body and having
a bottom surface shaped to contact the truck body, and
a top surface opposite the bottom surface.

20. The bracket of claim 15, wherein the first left positioning pin hole and the first right positioning pin hole are smaller than the left pivot pin hole and the right pivot pin hole respectively.

* * * * *